Oct. 25, 1960     J. D. INGHAM ET AL     2,957,363
ENERGY-BALANCED DRIVE OF A ROTARY SYSTEM AT CYCLICALLY
REPEATING CONTINUOUSLY VARYING VELOCITY
Filed Sept. 16, 1958     3 Sheets-Sheet 1

INVENTORS
James D. Ingham
and Given A. Brewer
BY
Attorney.

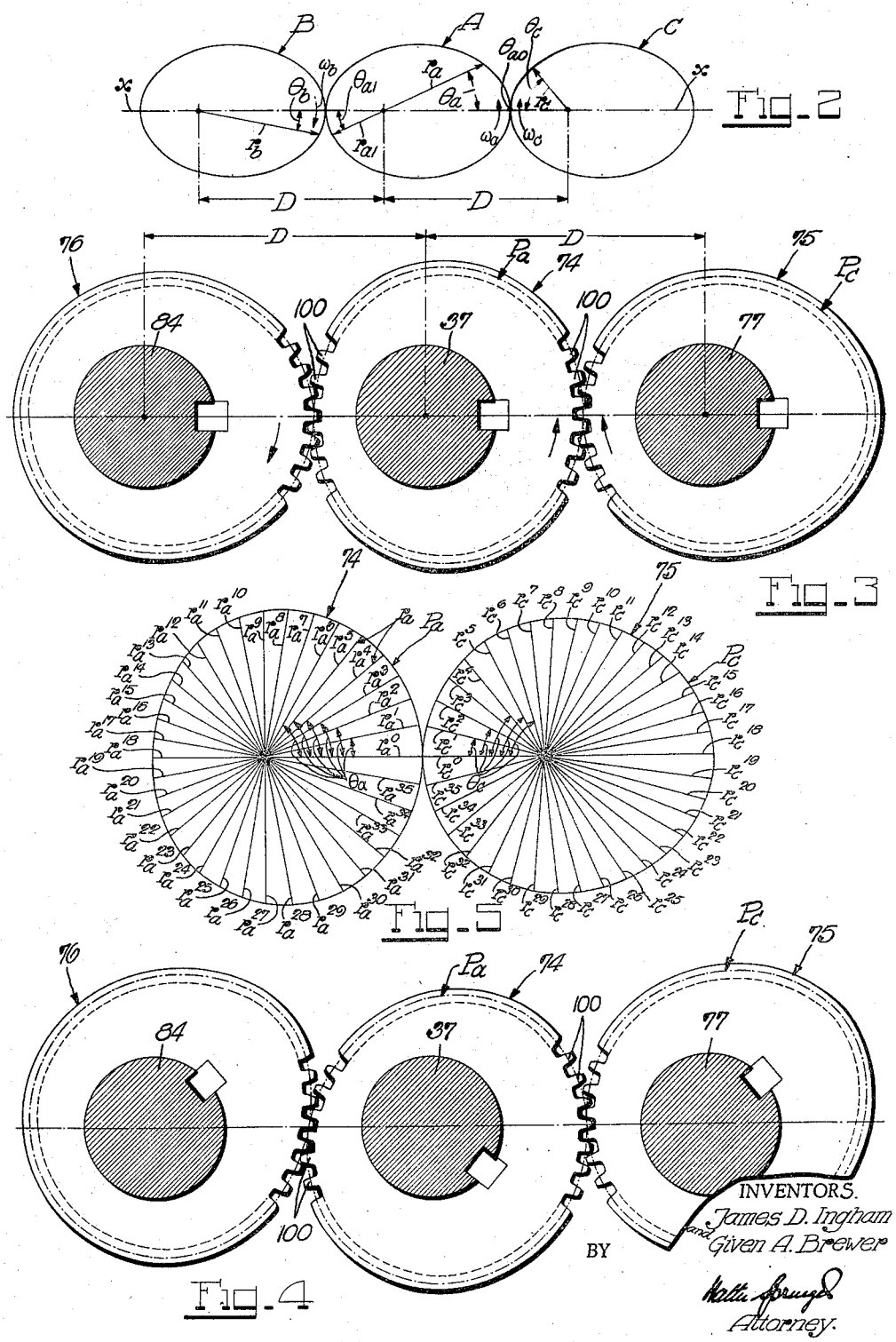

United States Patent Office 2,957,363
Patented Oct. 25, 1960

2,957,363

ENERGY-BALANCED DRIVE OF A ROTARY SYSTEM AT CYCLICALLY REPEATING CONTINUOUSLY VARYING VELOCITY

James D. Ingham and Given A. Brewer, Marion, Mass., assignors to The Hallden Machine Company, Thomaston, Conn., a corporation of Connecticut Filed Sept. 16, 1958, Ser. No. 761,365

13 Claims. (Cl. 74—437)

This invention relates to a balanced-energy drive of a utility system and a counter system at continuously varying velocity.

The present invention is applicable especially, though not exclusively, to rotary shears for severing continuously fed stock, such as sheet metal, for example, into variable lengths. Rotary shears of this type have a pair of rotary shear drums with peripheral companion shear blades which cooperate on the drive of the drums in severing stock fed between them, and a flywheel adapted to counterbalance the shear drums, with the drums and flywheel having equal inertias. The drive of the shear drums and flywheel is usually variable to different r.p.m. of the drums for the severance of continuously fed stock into different lengths, and the drive customarily includes eccentric surge gears which are adjustable relative to the shear drums for momentary synchronization of the peripheral drum speeds with the continuously fed stock at the times of cut of any desired stock lengths. Accordingly, the shear drums and flywheel surge constantly between minimum and maximum speeds, and the ensuing alternating positive and negative torque surges in the shear drums are counteracted by alternating negative and positive torque surges in the flywheel.

To counteract the torque surges in the shear drums with equal but opposite torque surges in the flywheel, it has been customary to interpose in their drive, as a last stage thereof, a driving elliptical gear and two driven elliptical gears in mesh with the driving gear and drivingly connected with the shear drums and flywheel, respectively, with these gears being adjustable relative to the shear drums for synchronization purposes as aforementioned. It has been found, however, that these elliptical gears fall considerably short of producing equal and opposite torque surges in the shear drums and countering flywheel, with resultant pulsating feed back of excessive unbalanced torque into the drum drive and the rest of the shear.

Lately, there have become known shear drives, disclosed in the U.S. Patent to Orr, No. 2,861,635, dated November 25, 1958, and in the copending application of Karl W. Hallden, Serial No. 668,956, filed July 1, 1957, in which the torque surges, and hence also the torques, in the shear drums and the countering flywheel are at any instant equal and opposed to each other. While these shear drives are in their performance far superior to the even earlier shear drives with the aforementioned elliptical gears and are entirely satisfactory for many practical applications, exhaustive tests and analysis have led to the startling discovery that there are still torque unbalances in these drives.

It is the primary aim and object of the present invention to provide a rotary utility system and counter system with a drive, including a preferably last gear stage of constantly varying instantaneous velocity ratios, to impart to these systems rotation at cyclically repeating continuously varying velocities, with the last-stage gears designed to achieve at any instant exact torque balance in the drive shaft thereof and thereby eliminate any and all torque feedback into this shaft and the rest of the drive regardless of the operating speed thereof.

It is a more specific object of the present invention to achieve the aforementioned torque-balanced drive of the rotary utility and counter systems by designing these systems, which include the driven ones of the aforementioned last-stage gears, so that their inertias are equal in the first place, and by further designing these driven gears and their common driving gear so that the torques of the former react with the later in achieving at any instant exact torque balance in the drive shaft of these last-stage gears.

It is another object of the present invention to provide the rotary utility and counter systems with the aforementioned torque-balanced drive of which the driving and driven gears of the last gear stage thereof are so designed that the work performed by one driven gear on the common driving gear is at any instant equal to the work performed by the latter gear on the other driven gear, thereby to achieve equal instantaneous work interchange between these driven gears which rules out any possible reactive force in the common driving gear that could at any time cause an unbalanced torque condition in the drive shaft thereof.

It is a further object of the present invention to attain the aforementioned equal instantaneous work interchange between the driven gears of the last gear stage of the drive of the rotary utility and counter systems, by designing the gears of this last stage, not on the basis of their torques, but rather on the basis of their kinetic energies, to the end of maintaining a constant kinetic energy level of the driven gears for a given speed of the driving gear as a basic condition for achieving the desired end.

Accordingly, it is another object of the present invention to design the aforementioned last-stage or "constant-energy" gears of the drive of the rotary utility and counter systems so that the exchange of kinetic energy between the driven gears thereof via the common driving gear is equal at any instant, or in other words, the rate at which kinetic energy is given up by either driven gear is equal to the rate at which it is absorbed by the other driven gear, in order that these driven gears with their different instantaneous kinetic energies will have a constant kinetic energy level.

A further object of the present invention is to design the aforementioned constant-energy gears of the drive of the rotary utility and counter systems so that they satisfy not only the condition that the rate of change of the kinetic energy imparted to the driven gears by the driving gear is the same, but also the further conditions that the perimeter of the pitch lines of these gears is the same for gear compatibility and that the driven gears have a specified velocity ratio.

It is another object of the present invention to obtain for these constant-energy gears of the drive of the rotary utility and counter systems profile geometries which not only satisfy the aforementioned conditions of these gears, but which also permit their layout for actual production of these gears.

Further objects and advantages will appear to those skilled in the art from the following, considered in conjunction with the accompanying drawings.

In the accompanying drawings, in which certain modes of carrying out the present invention are shown for illustrative purposes:

Fig. 2 is a diagrammatic layout of a set of gears of arbitrary outline for reference purposes in the derivation of the correct profile geometries of the constant-energy gears of the present invention;

Figure 33 is an enlarged section through the shear as taken on the line 3—3 of Fig. 1, and showing the constant-energy gears of the present invention;

Fig. 4 is a section similar to Fig. 3, showing the constant-energy gears in a different operating position;

Fig. 5 illustrates the development of the pitch lines of the constant-energy gears;

Fig. 6 is a graph depicting featured kinetic energy characteristics of the constant-energy gears;

Fig. 7 is a graph depicting certain torque characteristics of the constant-energy gears.

Figure 1:
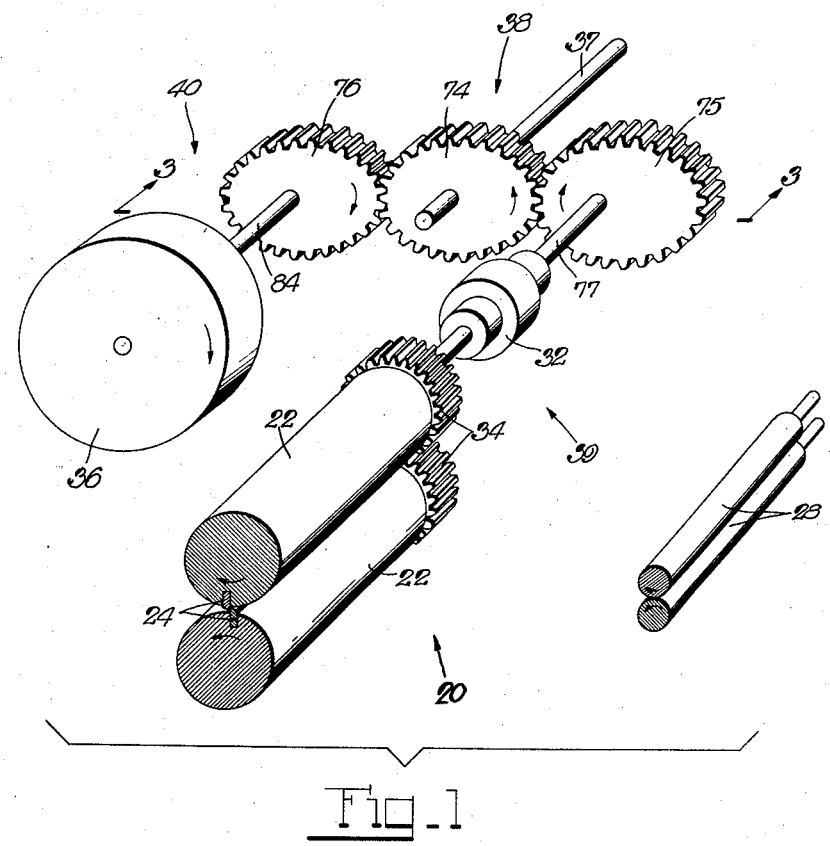
Fig. 1 is a fragmentary diagrammatic perspective view of an exemplary rotary sheer in which the present invention is embodied.

Referring to the drawings, and more particularly to Fig. 1 thereof, the reference numeral 20 designates an exemplary conventional shear having rotary companion drums 22 which are provided with longitudinal shear blades 24, respectively, that cooperate on the drive of the drums 22 to sever stock fed between the later. The shear 20 further provides a drive for the shear drums, including as a presently last stage thereof a gear system or synchronizing mechanism 38. The shear 20 also provides cooperating feed rolls 28 which may be power-driven to feed continuous stock to-be-severed, such as sheet metal, for example, to the shear drums 22 at a constant rate.

The drum drive includes a drive shaft 37 that is the input shaft of the gear system or stage 38 which includes a driving gear 74 on the drive shaft 37 and a driven gear 75 on a shaft 77. The shaft 77 is, through intermediation of an angularly adjustable coupling 32, drivingly connected with one of the shear drums 22, and both shear drums are connected by gears 34 for their joint drive in opposite directions.

The gears 74, 75 of the gear system 38 are surge gears, so that the shear drums 22 are driven in recurring speed surges with ensuing recurring torque surges in the shear drums. To counteract the recurring torque surges in the shear drums 22, there is provided a flywheel 36 on a rotary shaft 84 which also carries another surge gear 76 of the gear system 38 in mesh with the driving gear 74 thereof.

In operation of the shear, i.e., with the drum drive and the feed-roll drive operative, continuous stock is fed at a constant rate by the feed rolls 28 to the shear drums 22, with the shear blades 24 cooperating, presently once during each revolution of the shear drums, to cut the stock into predetermined lengths. To prevent marring or buckling of the fed stock by or under the action of the turning shear blades 24 thereon, the surge gears of the gear system 38 are, at the coupling 32, so angularly adjusted relative to the shear drums 22 that the peripheral speeds of the latter, and more particularly that of their shear blades 24, is at the time of each stock severance by the latter, synchronized with the feed of the stock by the feed rolls 28.

Assuming now that it is desired to cut continuous stock into different lengths, this may, for example, be achieved by varying or adjusting the drum drive to a corresponding r.p.m. of the shear drums without in any way varying the drive of the feed rolls 28. However, with the drum drive thus adjusted to the correct r.p.m. of the shear drums for the desired lengths of stock cuts, there still remains the task of synchronizing the shear blades 24 with the feed of the stock at the times of cut, and this is achieved by appropriate angular adjustment of the gears of the gear system 38 relative to the shear drums, as will be readily understood.

The surge gears 74, 75 and 76 are constantly varying ratio gears, with the driven gears 75 and 76 being identical and so meshed with the driving gear 74 that the shear drums 22 are accelerated and decelerated as, and at the same rate at which, the flywheel 36 is decelerated and accelerated, respectively. The exemplary shear 20 thus provides two rotary surge systems or masses, namely a utility or shear system 39 comprising the shear drums 22 with their gears 34, coupling 32 and the driven gear 75 with its shaft 77, and a counter system 40 comprising the flywheel 36, driven gear 76 and shaft 84.

Referring now specifically to the gears 74, 75 and 76 of the synchronizing mechanism 38, these gears may aptly be termed "constant-energy" gears by virtue of the fact that the kinetic energy level of the driven gears 75 and 76 is constant as will be fully explained hereinafter. It has already been mentioned that the primary objective of the present invention is to achieve at any instant exact torque balance in the drive shaft 37 of the constant-energy gears. In keeping with the solution of the problem to achieve at any instant exact torque balance in the drive shaft 37 of the constant-energy gears on maintaining a constant energy level in the driven gears 75 and 76 thereof, it will be shown that it is a basic requirement for this achievement that the inertias of the rotary shear and counter systems are equal. The design of the rotary shear and counter systems so that their inertias are equal is a simple matter and, hence, requires no further explanation.

Thus, it is the next objective to design the constant energy gears 74, 75 and 76 so that the energy level of the driven gears 75 and 76 thereof will be constant for a constant velocity of the drive shaft 37, or the energy exchange between these driven gears will at any instant be equal regardless of variations in the velocity of this drive shaft, thereby obtaining in either event exact torque balance in the drive shaft 37, as will be explained hereinafter. As already mentioned hereinbefore, the constant energy gears must satisfy, and the derivation of their profile geometries must be based on, the conditions that (1) The rate of interchange of the kinetic energy between the driven gears via the driving gear is the same, (2) The perimeter of the pitch lines of the driving and driven gears is the same for the required 1 to 1 gear ratio, and (3) Each driven gear has the same specified velocity ratio.

For the sake of brevity in expression, the profile geometries of the constant-energy gears are derived with reference to Fig. 2 in which the gears 74, 76 and 75 are denoted by the characters A, B and C, respectively, and their radii $r$ and displacement angles $\theta$ are denoted by the suffixes $a$, $b$ and $c$, respectively, and the center distances between the gears are denoted by the character D. It is understood that Fig. 2 is merely a reference figure and that the profiles of the gears depicted therein are by no means correct profiles but are merely arbitrarily drawn profiles.

To satisfy condition 1 above, the rate of change of the kinetic energy E of the driven gear C must be equal to the rate of change of the kinetic energy E of the other driven gear B, thus $dE_c = -dE_b$, or (1) $$dE_c + dE_b = 0$$

$dE_c$ and $dE_b$ may also be expressed in terms of torque and inertia. Thus, $$dE_b = T_b d\theta_b = I_b \frac{d^2\theta_b}{dt^2} d\theta_b$$

and $$dE_c = T_c d\theta_c = I_c \frac{d^2\theta_c}{dt^2} d\theta_c$$

where T represents torque and I represents inertia. Hence, Expression 1 above can be written as $$T_c d\theta_c + T_b d\theta_b = 0$$

or (2) $$T_c d\theta_c = -T_b d\theta_b$$

Equation 2 above can also be written in terms of inertias instead of torques. Thus $$I_c \frac{d^2\theta_c}{dt^2} d\theta_c = -I_b \frac{d^2\theta_b}{dt^2} d\theta_b$$

and, since the inertias of the gears B and C will be made equal as aforementioned, $I_b$ and $I_c$ may be cancelled from this equation, leaving (3) $$\frac{d^2\theta_c}{dt^2} d\theta_c = -\frac{d^2\theta_b}{dt^2} d\theta_b$$

In order that the constant-energy gears will be geometrically compatible, they must meet the following conditions:

(4) $r_a d\theta_a = r_c d\theta_c$, and $r_{a1} d\theta_a = r_b d\theta_b$

From the Expression 4 above may be obtained $$d\theta_c = \frac{r_a d\theta_a}{r_c} \text{ and } d\theta_b = \frac{r_{a1} d\theta_a}{r_b}$$

By substituting these expressions for $d\theta_b$ and $d\theta_c$ in Equation 3 above, one obtains $$\frac{d^2\theta_c}{dt^2} \frac{(r_a d\theta_a)}{r_c} = -\frac{d^2\theta_b}{dt^2} \frac{(r_{a1} d\theta_a)}{r_b}$$

which may be written as follows:

(5) $$\frac{r_a}{r_c} \frac{d^2\theta_c}{dt^2} d\theta_a = -\frac{r_{a1}}{r_b} \frac{d^2\theta_b}{dt^2} d\theta_a$$

Since $$\frac{d^2\theta_c}{dt^2}$$

can be written as $$\frac{d}{dt}\left(\frac{d\theta_c}{dt}\right)$$

and since $$\frac{d\theta_c}{dt}$$

can be expressed by $$\frac{r_a}{r_c}\omega_a$$

where $\omega$ constitutes angular velocity, $$\frac{d^2\theta_c}{dt^2}$$

can also be written as $$\omega_a \frac{d}{dt}\left(\frac{r_a}{r_c}\right)$$

and similarly, the expression $$\frac{d^2\theta_b}{dt^2}$$

can be written as $$\omega_a \frac{d}{dt}\left(\frac{r_{a1}}{r_b}\right)$$

By substituting these latter expressions for $$\frac{d^2\theta_c}{dt^2} \text{ and } \frac{d^2\theta_b}{dt^2}$$

in Equation 5 above, one obtains (6) $$\frac{r_a}{r_c}\omega_a \frac{d}{dt}\left(\frac{r_a}{r_c}\right) d\theta_a = -\frac{r_{a1}}{r_b}\omega_a \frac{d}{dt}\left(\frac{r_{a1}}{r_b}\right) d\theta_a$$

The values $\omega_a$ and $d\theta_a$ cancel each other in Equation 6 above, leaving (7) $$\frac{r_a}{r_c} \frac{d}{dt}\left(\frac{r_a}{r_c}\right) = -\frac{r_{a1}}{r_b} \frac{d}{dt}\left(\frac{r_{a1}}{r_b}\right)$$

It will now be shown that the expression $$\frac{r_c \frac{dr_a}{dt} - r_a \frac{dr_c}{dt}}{r_c^2}$$

is equal to the expression $$\frac{d}{dt}\left(\frac{r_a}{r_c}\right)$$

in Equation 7 above. To this end, recourse was had to the expression $$d\frac{u}{v} = \frac{vdu - udv}{v^2}$$

(Pierce's Short Table of Integrals). To use the expression $$\frac{vdu - udv}{v^2}$$

as intended, $r_a$ and $r_c$ are substituted for $u$ and $v$, respectively, wherefore (8) $$\frac{d}{dt}\left(\frac{r_a}{r_c}\right) = \frac{r_c \frac{dr_a}{dt} - r_a \frac{dr_c}{dt}}{r_c^2}$$

Using the same expression for $$d\frac{u}{v}$$

above, the substituting $r_{a1}$ and $r_b$ for $u$ and $v$, respectively, (9) $$\frac{d}{dt}\left(\frac{r_{a1}}{r_b}\right) = \frac{r_b \frac{dr_{a1}}{dt} - r_{a1} \frac{dr_b}{dt}}{r_b^2}$$

Since $r_c = D - r_a$, the derivative of $r_c$, i.e., $$\frac{dr_c}{dt}$$

equals $$\frac{d}{dt}(D) - \frac{dr_a}{dt}$$

Since D is a constant, its derivative is zero, hence $$\frac{dr_c}{dt} = 0 - \frac{dr_a}{dt}$$

Also, since $r_b = D - r_{a1}$, the derivative of $r_b$, i.e., $$\frac{dr_b}{dt} \text{ equals } -\frac{dr_{a1}}{dt}$$

By substituting the foregoing expression $$-\frac{dr_a}{dt} \text{ for } \frac{dr_c}{dt}$$

and expressing $r_c$ as $D - r_a$, Equation 8 above, becomes $$\frac{d}{dt}\left(\frac{r_a}{r_c}\right) = \frac{(D-r_a)\frac{dr_a}{dt} - r_a\left(-\frac{dr_a}{dt}\right)}{(D-r_a)^2} = \frac{\frac{dr_a}{dt}D}{(D-r_a)^2}$$

Similarly, since $r_b = D - r_{a1}$, and $$\frac{dr_b}{dt} = -\frac{dr_{a1}}{dt}$$

as specified above, Equation 9 above, by substitution, becomes $$\frac{d}{dt}\left(\frac{r_{a1}}{r_b}\right) = \frac{(D-r_{a1})\frac{dr_{a1}}{dt} - r_{a1}\left(-\frac{dr_{a1}}{dt}\right)}{(D-r_{a1})^2} = \frac{\left(\frac{dr_{a1}}{dt}\right)D}{(D-r_{a1})^2}$$

By substituting these latter expressions for $$\frac{d}{dt}\left(\frac{r_a}{r_c}\right) \text{ and } \frac{d}{dt}\left(\frac{r_{a1}}{r_b}\right)$$

in Equation 7 above, and expressing $r_b$ as $D - r_{a1}$ and $r_c$ as $D - r_a$, this equation becomes:

(10)

$$\left[\frac{r_a}{D-r_a}\right]\left[\frac{\frac{dr_a}{dt}D}{(D-r_a)^2}\right] = -\left[\frac{r_{a1}}{D-r_{a1}}\right]\left[\frac{\frac{dr_{a1}}{dt}D}{(D-r_{a1})^2}\right]$$

By multiplication, Equation 10 above becomes $$\frac{r_a \frac{dr_a}{dt} D}{(D-r_a)^3} = -\frac{r_{a1} \frac{dr_{a1}}{dt} D}{(D-r_{a1})^3}$$

and on canceling D from the latter equation, and bringing both expressions $(D-r_a)^3$ and $(D-r_{a1})^3$ to one side of the equation, the same becomes—

$$-\frac{r_a \frac{dr_a}{dt}}{r_{a1} \frac{dr_{a1}}{dt}} = \frac{(D-r_a)^3}{(D-r_{a1})^3}$$

or $$r_{a1} \frac{dr_{a1}}{dt}(D-r_{a1})^3$$

(11) $$\frac{(D-r_a)^3}{(D-r_{a1})^3} = -\frac{r_a}{r_{a1}} \left[ \frac{\frac{dr_a}{dt}}{\frac{dr_{a1}}{dt}} \right]$$

The expression $$\frac{dr_a}{dt}$$

in Equation 11 above can also be expressed as $$\frac{dr_a}{d\theta_a} \frac{d\theta_a}{dt}, \text{ of which } \frac{d\theta_a}{dt} \text{ is equal to } \omega_a$$

Hence, by substitution, $$\frac{dr_a}{dt} \text{ is also equal to } \omega_a \frac{dr_a}{d\theta_a}$$

and similarly, $$\frac{dr_{a1}}{dt} \text{ is equal to } \omega_a \frac{dr_{a1}}{d\theta_a}$$

On substituting these latter expressions for $$\frac{dr_a}{dt} \text{ and } \frac{dr_{a1}}{dt}$$

In Equation 11 above, the same becomes $$\frac{(D-r_a)^3}{(D-r_{a1})^3} = -\frac{r_a \omega_a \frac{dr_a}{d\theta_a}}{r_{a1} \omega_a \frac{dr_{a1}}{d\theta_a}}$$

from which $\omega_a$ may be canceled, leaving

(12) $$\frac{(D-r_a)^3}{(D-r_{a1})^3} = -\frac{r_a \frac{dr_a}{d\theta_a}}{r_{a1} \frac{dr_{a1}}{d\theta_a}}$$

It follows from the preceding that Expression 12 above satisfies the aforementioned condition that the rate of interchange of the kinetic energy between the driven gears via the driving gear is the same. Moreover, this Expression 12 was evolved from the initial energy Equation 1 above in the foregoing manner so as to express the energy equation in terms of the elements required for the profile geometry of the driving gear, i.e., its coordinate radii $r_a$ and $r_{a1}$, the displacement angles $\theta_a$ of the radii $r_a$, and the center distance D between the gears.

The next objective is to evolve an expression for $r_a$ which satisfies not only the condition that the rate of interchange of the kinetic energy between the driven gears via the driving gear is the same, but which further satisfies the other two conditions that the perimeter of the pitch lines of the driving and driven gears is the same and that each driven gear has the same specified velocity ratio. To this end, an expression for the instantaneous velocity ratio $V_{rc}$ of the gear C (Fig. 2) has been developed. Thus, (a) $$V_{rc} = \frac{1}{\alpha}(1+K \cos \theta_a)^{1/2}$$

where $\alpha$ is a constant to satisfy the condition that the perimeter of the pitch lines of the gears is the same, and K is a constant to satisfy the requirement that the driven gears have the same velocity ratio $V_r$. In view of (a) above, it follows that the instantaneous velocity ratio $V_{rb}$ of the gear B is (b) $$V_{rb} = \frac{1}{\alpha}[1+K \cos (\theta_a+180°)]^{1/2} = \frac{1}{\alpha}(1-K \cos \theta_a)^{1/2}$$

The instantaneous velocity ratio $V_{rc}$ is also equal to $$\frac{r_a}{r_c} \text{ or } \frac{r_a}{D-r_a}$$

Hence, by substituting in Expression (a) above $$\frac{r_a}{D-r_a}$$

for $V_{rc}$, this expression becomes $$\frac{r_a}{D-r_a} = \frac{1}{\alpha}(1+K \cos \theta_a)^{1/2}$$

from which it follows that $$r_a = (D-r_a)\left[\frac{1}{\alpha}(1+K \cos \theta_a)^{1/2}\right]$$

or, by multiplication, $$r_a = \frac{D}{\alpha}(1+K \cos \theta_a)^{1/2} - \frac{r_a}{\alpha}(1+K \cos \theta_a)^{1/2}$$

By bringing $r_a$ to one side of the latter equation, the same becomes $$r_a\left[1+\frac{1}{\alpha}(1+K \cos \theta_a)^{1/2}\right] = \frac{D}{\alpha}(1+K \cos \theta_a)^{1/2}$$

or $$r_a = \frac{\frac{D}{\alpha}(1+K \cos \theta_a)^{1/2}}{1+\frac{1}{\alpha}(1+K \cos \theta_a)^{1/2}}$$

$$= \frac{D(1+K \cos \theta_a)^{1/2}}{\alpha+(1+K \cos \theta_a)^{1/2}}$$

Thus, the general expression for $r_a$ is

(13) $$r_a(\theta_a) = D\frac{(1+K \cos \theta_a)^{1/2}}{\alpha+(1+K \cos \theta_a)^{1/2}}$$

To prove that the Function 13 above satisfies the energy Equation 12 above, it will be noted from the latter that the derivatives of $r_a$ and of $r_{a1}$ will have to be obtained. To this end, recourse was had to the expressions

(14) $$d\left(\frac{u}{v}\right) = \frac{v du - u dv}{v^2}$$

and

(15) $$dx^n = nx^{n-1}dx$$

which were taken from Peirce's Short Table of Integrals. For bringing the derivative of $r_a(\theta_a)$ into the form of the Expression 14 above, the expression $(1+K \cos \theta_a)^{1/2}$ in (13) above is substituted for $u$, and the expression $\alpha+(1+K \cos \theta_a)^{1/2}$ in (13) above is substituted for $V$. For the derivation of $du$, the Expression 15 above is resorted to by substituting therein for $x$ the above substitute expression for $u$ to the zero power, thus $$x = 1+K \cos \theta_a$$

and by substituting for $n$ the value ½, this being the exponent of $1+K \cos \theta_a$ in the above substitute expression for $u$. The derivative of $x$, and hence of its substitute $1+K \cos \theta_a$ is $-K \sin \theta_a$, for $d \cos \theta_a = -\sin \theta_a$.

Hence $dx = -K \sin \theta_a$. Using these substitute expressions for $n$, $x$ and $dx$, the derivation of $du$ is as follows:

$$du = \tfrac{1}{2}(1+K\cos\theta_a)^{-1/2}(-K\sin\theta_a) = \frac{-\tfrac{1}{2}K\sin\theta_a}{(1+K\cos\theta_a)^{1/2}}$$

Similarly, the derivation of $dv$ is as follows:

$$dv = \tfrac{1}{2}(1+K\cos\theta_a)^{-1/2}(-K\sin\theta_a) = \frac{-\tfrac{1}{2}K\sin\theta_a}{(1+K\cos\theta_a)^{1/2}}$$

By substituting the foregoing expressions for $u$, $v$, $du$ and $dv$ in Equation 14 above, the derivative of $r_a(\theta_a)$ is $$\frac{dr_a}{d\theta_a} = D\frac{[\alpha+(1+K\cos\theta_a)^{1/2}]\left[\dfrac{-\tfrac{1}{2}K\sin\theta_a}{(1+K\cos\theta_a)^{1/2}}\right] - [(1+K\cos\theta_a)^{1/2}]\left[\dfrac{-\tfrac{1}{2}K\sin\theta_a}{(1+K\cos\theta_a)^{1/2}}\right]}{[\alpha+(1+K\cos\theta_a)^{1/2}]^2}$$

$$= D\frac{-\alpha\tfrac{1}{2}K\sin\theta_a + (1+K\cos\theta_a)^{1/2}(-\tfrac{1}{2}K\sin\theta_a) - (1+K\cos\theta_a)^{1/2}(-\tfrac{1}{2}K\sin\theta_a)}{[\alpha+(1+K\cos\theta_a)^{1/2}]^2[1+K\cos\theta_a]^{1/2}}$$

The latter equation reduces to

(16) $\quad \dfrac{dr_a}{d\theta_a} = \dfrac{-\tfrac{1}{2}\alpha DK\sin\theta_a}{[\alpha+(1+K\cos\theta_a)^{1/2}]^2[1+K\cos\theta_a]^{1/2}}$ By using the Expressions 13 and 16 above for $r_a$ and for $$\frac{dr_a}{d\theta_a}$$

respectively, it follows that $$r_a\frac{dr_a}{d\theta_a} = \left[D\frac{(1+K\cos\theta_a)^{1/2}}{\alpha+(1+K\cos\theta_a)^{1/2}}\right]\left[\frac{-\tfrac{1}{2}\alpha DK\sin\theta_a}{(\alpha+(1+K\cos\theta_a)^{1/2})^2(1+K\cos\theta_a)^{1/2}}\right]$$

which reduces to

(17) $\quad r_a\dfrac{dr_a}{d\theta_a} = \dfrac{-\tfrac{1}{2}\alpha D^2K\sin\theta_a}{[\alpha+(1+K\cos\theta_a)^{1/2}]^3}$ It will be noted from Fig. 2 that the angle $\theta_{a1}$ for $r_{a1}$ is with respect to the $\theta_{a0}$ point equal to $\theta_a+180°$. Since the cos of $\theta+180°$ is equal to $-\cos\theta$, $r_{a1}$ may be expressed with respect to $\theta_a$ in the general Expression 13 for $r_a$. Thus,

(18) $\quad r_{a1}(\theta_a) = D\dfrac{(1-K\cos\theta_a)^{1/2}}{\alpha+(1-K\cos\theta_a)^{1/2}}$ It has already been mentioned that the derivative of $r_{a1}$ is also required in order to prove that the Expressions 13 and 18 for $r_a$ and $r_{a1}$, respectively, satisfy the required constant energy condition of the driven gears. The derivative of $r_{a1}$ may be obtained in a manner similar to that in which the derivative of $r_a$ has been obtained, with the result that

(19) $\quad \dfrac{dr_{a1}}{d\theta_a} = \dfrac{\tfrac{1}{2}\alpha DK\sin\theta_a}{[\alpha+(1-K\cos\theta_a)^{1/2}]^2[1-K\cos\theta_a]^{1/2}}$ By using the Expressions 18 and 19 above for $r_{a1}$, and for $$\frac{dr_{a1}}{d\theta_a}$$

respectively, it follows that $$r_{a1}\frac{dr_{a1}}{d\theta_a} = \left[D\frac{(1-K\cos\theta_a)^{1/2}}{\alpha+(1-K\cos\theta_a)^{1/2}}\right]\left[\frac{\tfrac{1}{2}\alpha DK\sin\theta_a}{[\alpha+(1-K\cos\theta_a)^{1/2}]^2(1-K\cos\theta_a)^{1/2}}\right]$$

which reduces to

(20) $\quad r_{a1}\dfrac{dr_{a1}}{d\theta_a} = \dfrac{\tfrac{1}{2}\alpha D^2K\sin\theta_a}{[\alpha+(1-K\cos\theta_a)^{1/2}]^3}$ Using the Expressions 17 and 20 above for $$r_a\frac{dr_a}{d\theta_a} \text{ and for } r_{a1}\frac{dr_{a1}}{d\theta_a}$$

respectively, it follows that the right side of the energy Equation 12 above becomes (21)

$$-\frac{r_a\dfrac{dr_a}{d\theta_a}}{r_{a1}\dfrac{dr_{a1}}{d\theta_a}} = -\frac{\dfrac{-\tfrac{1}{2}\alpha D^2K\sin\theta_a}{[\alpha+(1+K\cos\theta_a)^{1/2}]^3}}{\dfrac{\tfrac{1}{2}\alpha D^2K\sin\theta_a}{[\alpha+(1-K\cos\theta_a)^{1/2}]^3}} = \frac{[\alpha+(1-K\cos\theta_a)^{1/2}]^3}{[\alpha+(1+K\cos\theta_a)^{1/2}]^3}$$

It will be understood with reference to Fig. 2 that $r_c = D - r_a$. Hence, by using the Expression 13 above for $r_a$, $r_c$ can be expressed as follows:

$$r_c = D - \frac{D(1+K\cos\theta_a)^{1/2}}{\alpha+(1+K\cos\theta_a)^{1/2}} = \frac{D[\alpha+(1+K\cos\theta_a)^{1/2}] - D(1+K\cos\theta_a)^{1/2}}{\alpha+(1+K\cos\theta_a)^{1/2}}$$

$$= \frac{\alpha D + D(1+K\cos\theta_a)^{1/2} - D(1+K\cos\theta_a)^{1/2}}{\alpha+(1+K\cos\theta_a)^{1/2}} = \frac{\alpha D}{\alpha+(1+K\cos\theta_a)^{1/2}}$$

Thus,

(22) $\quad r_c = D - r_a = \dfrac{\alpha D}{\alpha+(1+K\cos\theta_a)^{1/2}}$

It will also be understood with reference to Fig. 2 that $r_b = D - r_{a1}$. Hence, by using the Expression 18 above for $r_{a1}$, $r_b$ can be expressed as follows:

$r_b = D - \dfrac{D(1-K\cos\theta_a)^{1/2}}{\alpha+(1-K\cos\theta_a)^{1/2}}$, which reduces to $r_b$ $$= \frac{\alpha D}{\alpha+(1-K\cos\theta_a)^{1/2}}$$

Thus,

(23) $\quad r_b = D - r_{a1} = \dfrac{\alpha D}{\alpha+(1-K\cos\theta_a)^{1/2}}$ It will now be shown that the left side of the energy Equation 12 above is indeed equal to the Expression 21 above for $$-\frac{r_a\dfrac{dr_a}{d\theta_a}}{r_{a1}\dfrac{dr_{a1}}{d\theta_a}}$$

Thus, using the Expressions 22 and 23 above for $D-r_a$ and $D-r_{a1}$, it follows that $$\left[\frac{D-r_a}{D-r_{a1}}\right]^3 = \left[\frac{\dfrac{\alpha D}{\alpha+(1+K\cos\theta_a)^{1/2}}}{\dfrac{\alpha D}{\alpha+(1-K\cos\theta_a)^{1/2}}}\right]^3$$

which reduces to

(24) $\quad \left[\dfrac{D-r_a}{D-r_{a1}}\right]^3 = \dfrac{[\alpha+(1-K\cos\theta_a)^{1/2}]^3}{[\alpha+(1+K\cos\theta_a)^{1/2}]^3}$ Hence, on substituting in the energy Equation 12 above the expressions for $$-\frac{r_a \frac{dr_a}{d\theta_a}}{r_{a1}\frac{dr_{a1}}{d\theta_a}} \text{ and for } \left[\frac{D-r_a}{D-r_{a1}}\right]^3$$

in Equations 21 and 24 above, it follows that $$(25) \quad \frac{[\alpha+(1-K\cos\theta_a)^{1/2}]^3}{[\alpha+(1+K\cos\theta_a)^{1/2}]^3} = \frac{[\alpha+(1-K\cos\theta_a)^{1/2}]^3}{[\alpha+(1+K\cos\theta_a)^{1/2}]^3}$$

This proves that the Expressions 13 and 18 for $r_a$ and $r_{a1}$ satisfy the condition of constant energy.

It will now be shown that a value for the arbitrary constant K can be found which will permit the general Expression 13 above for $r_a$ to satisfy the condition that the driven gears have the same predetermined velocity ratio $V_r$. Thus, it will be understood with reference to Fig. 2 that $$(26) \quad \frac{r_a}{D-r_a} = V_r \frac{(r_{a1})}{(D-r_{a1})}$$

By substituting in this Equation 26 the expressions for $r_a$, $D-r_a$, $r_{a1}$ and $D-r_{a1}$ in Equations 13, 22, 18 and 23 above, one obtains $$\frac{\frac{D(1+K\cos\theta_a)^{1/2}}{\alpha+(1+K\cos\theta_a)^{1/2}}}{\frac{\alpha D}{\alpha+(1+K\cos\theta_a)^{1/2}}} = V_r \left[\frac{\frac{D(1-K\cos\theta_a)^{1/2}}{\alpha+(1-K\cos\theta_a)^{1/2}}}{\frac{\alpha D}{\alpha+(1-K\cos\theta_a)^{1/2}}}\right]$$

which expression reduces to $$\frac{D(1+K\cos\theta_a)^{1/2}}{\alpha D} = V_r\left[\frac{D(1-K\cos\theta_a)^{1/2}}{\alpha D}\right]$$

and further reduces to $$(1+K\cos\theta_a)^{1/2} = V_r(1-K\cos\theta_a)^{1/2}$$

It therefore follows that $$(27) \quad V_r = \frac{(1+K\cos\theta_a)^{1/2}}{(1-K\cos\theta_a)^{1/2}}$$

With reference to Fig. 2, it will be understood that $V_r$ is equal to the instantaneous maximum to minimum velocity ratio of the gear C which occurs when $\theta_a=0$. Since the cos of 0 degrees is 1, the Expression 27 above can be written $$(28) \quad V_r = \frac{(1+K)^{1/2}}{(1-K)^{1/2}}$$

Hence the velocity ratio requires that $$(1+K)^{1/2} = V_r(1-K)^{1/2}$$

Expression 28 above can be written $$V_r^2 = \frac{1+K}{1-K}$$

or $\quad V_r^2(1-K) = 1+K$ or $\quad V_r^2 - 1 = V_r^2 K + K$ from which follows that $$(29) \quad K = \frac{V_r^2 - 1}{V_r^2 + 1}$$

It will next be shown that a value for the arbitrary constant $\alpha$ can be found which will permit the general Expression 13 above for $r_a$ to satisfy the condition that the perimeter of the pitch lines of the gears is the same. The following expression satisfies this condition $$(30) \quad \int_{\theta_a=0}^{\theta_a=2\pi} d\theta_c = 2\pi$$

Since $r_c d\theta_c = r_a d\theta_a$, and $r_c = D - r_a$, the above integral is equivalent to $$\int_0^{2\pi}\frac{D}{r_c}d\theta_a - \int_0^{2\pi}\frac{r_a}{r_c}d\theta_a$$

or, since $$\frac{r_c}{r_c} = 1$$

and $d\theta_a = 2\pi$, is also equivalent to $$\int_0^{2\pi}\frac{D}{r_c}d\theta_a - 2\pi$$

Hence, $$\int_0^{2\pi}\frac{D}{r_c}d\theta_a - 2\pi = 2\pi$$

or $$\int_0^{2\pi}\frac{D}{r_c}d\theta_a = 4\pi = \int_0^{2\pi}\frac{d\theta_a}{\frac{r_c}{D}}$$

The function $$\frac{r_c}{D}$$

can be expressed as $$\frac{D-r_a}{D}, \text{ or as } 1-\frac{r_a}{D}$$

Hence $$(31) \quad \int_0^{2\pi}\frac{d\theta_a}{1-\frac{r_a}{D}} = 4\pi$$

Since the assumed Function 13 above of $r_a$ is symmetric about the $\theta=0$ axis $x—x$ (Fig. 2), Expression 31 above reduces to $$(32) \quad \int_0^{\pi}\frac{d\theta_a}{1-\frac{r_a}{D}} = 2\pi$$

By substituting in Equation 32 above the expression for $r_a$ in Equation 13 above, one obtains $$\int_0^{\pi}\frac{d\theta_a}{1 - \frac{D(1+K\cos\theta_a)^{1/2}}{\alpha+(1+K\cos\theta_a)^{1/2}}\frac{1}{D}} = 2\pi$$

or $$\int_0^{\pi}\frac{d\theta_a}{\frac{\alpha+(1+K\cos\theta_a)^{1/2}-(1+K\cos\theta_a)^{1/2}}{\alpha+(1+K\cos\theta_a)^{1/2}}} = 2\pi$$

which reduces to $$(33) \quad \int_0^{\pi}\frac{\alpha+(1+K\cos\theta_a)^{1/2}}{\alpha}d\theta_a = 2\pi$$

Equation 33 above can also be written $$(34) \quad \int_0^{\pi}\frac{\alpha}{\alpha}+\frac{1}{\alpha}\int_0^{\pi}(1+K\cos\theta_a)^{1/2}d\theta_a = 2\pi$$

Through integration of $$\frac{\alpha}{\alpha}$$

Equation 34 above becomes $$\pi + \frac{1}{\alpha}\int_0^{\pi}(1+K\cos\theta_a)^{1/2}d\theta_a = 2\pi$$

or $$(35) \quad \int_0^{\pi}(1+K\cos\theta_a)^{1/2}d\theta_a = \pi\alpha$$

This Equation 35, an elliptic integral of the second kind is generally written as

(36) $$E(h) = \int_0^{\frac{\pi}{2}} (1 - h^2 \sin^2 x)^{1/2} dx$$

(Mark's Mechanical Engineer's Handbook, 2nd Edition, page 777)

To evaluate the integral (35) above, the same must be put in the form of $E(h)$ above. By using from tables of trigonometric functions the relationship $$\cos \theta = 1 - 2 \sin^2 \frac{\theta}{2}$$

the expression $K \cos \theta_a$ in (35) above is equal to $$K\left(1 - 2 \sin^2 \frac{\theta_a}{2}\right)$$

or $$K \cos \theta_a = K (1 - 2 \sin^2 x)$$

where $$x = \frac{\theta_a}{2}$$

By substituting this expression for $K \cos \theta_a$ in Equation 35 above, the latter becomes $$2 \int_0^{\frac{\pi}{2}} [1 + K(1 - 2 \sin^2 x)]^{1/2} dx = \pi \alpha$$

or $$2 \int_0^{\frac{\pi}{2}} [(1 + K) - 2K \sin^2 x]^{1/2} dx = \pi \alpha$$

Thus,

(37) $$\alpha = \frac{2}{\pi} \int_0^{\frac{\pi}{2}} [(1 + K) - 2K \sin^2 x]^{1/2} dx$$

In dividing both sides of Equation 37 above by $(1+K)^{1/2}$, one obtains $$\frac{\alpha}{(1+K)^{1/2}} = \frac{2}{\pi} \int_0^{\frac{\pi}{2}} \left[\frac{(1+K) - 2K \sin^2 x}{1+K}\right]^{1/2} dx$$

from which it follows that $$\alpha = \frac{2(1+K)^{1/2}}{\pi} \int_0^{\frac{\pi}{2}} \left[\frac{1+K}{1+K} - \frac{2K}{1+K} \sin^2 x\right]^{1/2} dx$$

which is equivalent to $$\alpha = \frac{2(1+K)^{1/2}}{\pi} \int_0^{\frac{\pi}{2}} \left(1 - \frac{2K}{1+K} \sin^2 x\right)^{1/2} dx$$

or

(38) $$\alpha = \frac{2(1+K)^{1/2}}{\pi} \int_0^{\frac{\pi}{2}} (1 - h^2 \sin^2 x)^{1/2} dx$$

where $$h^2 = \frac{2K}{1+K}$$

This integral (38) is now in the form of $E(h)$ in Expression 36 above.

The value of $h$ may be obtained when the velocity ratio has been selected. Thus, since $$K = \frac{V_r^2 - 1}{V_r^2 + 1}$$

as stated in Expression 29 above, it follows that $$h^2 = \frac{2\frac{V_r^2 - 1}{V_r^2 + 1}}{1 + \frac{V_r^2 - 1}{V_r^2 + 1}} = \frac{2V_r^2 - 2}{2V_r^2} = \frac{V_r^2 - 1}{V_r^2}$$

Hence

(39) $$h = \left[\frac{V_r^2 - 1}{V_r^2}\right]^{1/2} = \frac{\sqrt{V_r^2 - 1}}{V_r}$$

Let it now be assumed that the selected velocity ratio is 2 to 1, or $V_r = 2$, then $$h = \left(\frac{4-1}{4}\right)^{1/2} = \left(\frac{3}{4}\right)^{1/2} = \frac{\sqrt{3}}{2} = 0.866$$

It follows from (38) above, that the value of the constant $K$ for the selected velocity ratio must be known in order to obtain the value of the constant $\alpha$. Thus, with $V_r$ being presently equal to 2

$$K = \frac{4-1}{4+1} = \frac{3}{5} = 0.600$$

Coming now back to Equation 38 above, the part $$\int_0^{\frac{\pi}{2}} (1 - h^2 \sin^2 x)^{1/2} dx$$

thereof is equal to the complete integral of the second kind $E(h)$. Hence, Equation 38 above can be written

(40) $$\alpha = \frac{2(1+K)^{1/2}}{\pi} E(h)$$

To evaluate $E(h)$ for the exemplary selected velocity ratio $V_r = 2$, it is found that the angle whose sine is equal to $h(0.866)$ is $60°$, wherefore $\sin^{-1} h = 60°$. From Peirce's Short Table of Integrals, it will be found that $E(h)60° = 1.2111$.

By substituting the determined values of $K$ and $E(h)$ in Equation 40 above, $$\alpha = \frac{2(1+0.6)^{1/2} 1.2111}{\pi} = 0.9752$$

By substituting the determined values of $K$ and $\alpha$ in Expressions 13, 22 and 23 above, there will be obtained, for the exemplary velocity ratio $V_r = 2$ and for an exemplary center-to-center distance $D = 10$ inches, the following expressions for the desired three gear profiles:

(41) $$r_a = \frac{10\sqrt{1 + 0.600 \cos \theta_a}}{0.9752 + \sqrt{1 + 0.600 \cos \theta_a}}$$

$$r_b = \frac{9.752}{0.9752 + \sqrt{1 - 0.600 \cos \theta_a}}$$

(42) $$r_c = \frac{9.752}{0.9752 + \sqrt{1 + 0.600 \cos \theta_a}}$$

Listed below are actual lengths of radii $r_a$ of the driving gear 74 with reference to their respective displacement angles $\theta_a$ from $\theta_{a0}$ (Fig. 2). The lengths of these radii were obtained from Formula 41 above $V_r = 2$ and a centerto-center distance $D=10$ inches. Thus, the lengths of these radii, expressed in inches, are as follows:

| $\theta_a$ (degrees) | $r_a$ (inches) |
|---|---|
| 0 and 360 | $r_a^0 = 5.647$ |
| 10 and 350 | $r_a^1 = r_a^{35} = 5.640$ |
| 20 and 340 | $r_a^2 = r_a^{34} = 5.618$ |
| 30 and 330 | $r_a^3 = r_a^{33} = 5.583$ |
| 40 and 320 | $r_a^4 = r_a^{32} = 5.533$ |
| 50 and 310 | $r_a^5 = r_a^{31} = 5.469$ |
| 60 and 300 | $r_a^6 = r_a^{30} = 5.390$ |
| 70 and 290 | $r_a^7 = r_a^{29} = 5.296$ |
| 80 and 280 | $r_a^8 = r_a^{28} = 5.187$ |
| 90 and 270 | $r_a^9 = r_a^{27} = 5.063$ |
| 100 and 260 | $r_a^{10} = r_a^{26} = 4.925$ |
| 110 and 250 | $r_a^{11} = r_a^{25} = 4.776$ |
| 120 and 240 | $r_a^{12} = r_a^{24} = 4.618$ |
| 130 and 230 | $r_a^{13} = r_a^{23} = 4.456$ |
| 140 and 220 | $r_a^{14} = r_a^{22} = 4.298$ |
| 150 and 210 | $r_a^{15} = r_a^{21} = 4.154$ |
| 160 and 200 | $r_a^{16} = r_a^{20} = 4.038$ |
| 170 and 190 | $r_a^{17} = r_a^{19} = 3.961$ |
| 180 | $r_a^{18} = 3.934$ |

These radii and the pitch lines $P_a$ of gear 74 defined thereby are shown in Fig. 5 at a reduced scale, the pitch line being an accurate reproduction at reduced scale of the outline of the full-size pitch line. This pitch line $P_a$ may be plotted directly on a blank from which the gear is to be cut. Thus, the radii $r_a$ for as many angles $\theta_a$ as will produce an accurate outline of the pitch line $P_a$ will be laid out. After having the pitch line $P_a$ outlined in this exemplary fashion on the blank of the gear 74, an additional line may be provided on the blank to define the outer periphery or final contour of the latter. The blank may then be machined to its exact contour, whereupon the teeth 100 are cut therein in any suitable manner, preferably by accurate generation.

The driven gear 75 of the rotary shear system is a conjugate gear. Its pitch line $P_c$ (Fig. 5) may accurately be outlined by laying out as many radii $r_c$ as are necessary for this purpose. The lengths of $r_c$ may be obtained from Formula 42 above, or simply by subtracting the lengths of the coordinate radii $r_a$ from the known center distance of the gears, each radius $r_c$ having a coordinate radius $r_a$ with which it is aligned and continuous once during each revolution of the gears. Taking into consideration that the radii $r_c$, the lengths of which are obtained in either of the aforementioned fashions, are coordinates of radii $r_a$ whose angles $\theta_a$ are different from the angles $\theta_c$ of these radii $r_c$, it stands to reason that only by laying out many radii $r_c$ in close peripherally spaced relation with each other and with the coordinate radii $r_a$ of the driving gear 74 will be pitch line $P_c$ of the driven gear 75 be outlined accurately. However, the task of laying out the pitch line $P_c$ of the driven gear 75 will be greatly facilitated through the use of a formula, evolved hereinafter, which will give the exact angle $\theta_c$ of each radius $r_c$, so that the pitch line $P_c$ of the driven gear 75 may be laid out entirely independently of the driving gear 74. Of course, and as already mentioned, the driven gear 76 of the rotary counter system is exactly like the driven gear 75 of the rotary shear system, with these driven gears being so meshed with the driving gear that the radius of maximum length of either driven gear is continuous with the radius of minimum length of the driving gear when the radius of minimum length of the other driven gear is continuous with the radius of maximum length of the driving gear (Fig. 3).

Following are calculations to determine corresponding vectorial angles of the driving gear 74 and driven gear 75. Thus, with reference to Fig. 2, it will be noted that the instantaneous tangential velocity of either gear A or C is equal to its operating radius times its angular velocity, or $V = r\omega$. Hence, $r_a\omega_a = r_c\omega_c$, or $$(43) \qquad \omega_c = \frac{r_a\omega_a}{r_c}$$

By substituting in Equation 43 above the foregoing Expressions 13 and 22 for $r_a$ and $r_c$, one obtains $$\omega_c = \frac{\dfrac{D(1+K\cos\theta_a)^{1/2}}{\alpha + (1+K\cos\theta_a)^{1/2}}\omega_a}{\dfrac{\alpha D}{\alpha + (1+K\cos\theta_a)^{1/2}}}$$

which reduces to $$(44) \qquad \omega_c = \frac{\omega_a}{\alpha}(1+K\cos\theta_a)^{1/2}$$

By using the aforementioned exemplary velocity ratio $V_r = 2$, the constant $\alpha$ is equal to 0.9752 as aforementioned, so that $$\frac{1}{\alpha} = 1.0254$$

By substituting this value of $$\frac{1}{\alpha}$$

in Expression 44 above, the latter becomes $$(45) \qquad \omega_c = 1.0254\omega_a(1+K\cos\theta_a)^{1/2} = 1.0254\omega_a\sqrt{1+K\cos\theta_a}$$

Since $\theta_a = \omega_a t$, Expression 45 above can be written as follows $$(46) \qquad \omega_c = 1.0254\omega_a\sqrt{1+K\cos\omega_a t}$$

It is known that $$\frac{d\theta_c}{dt} = \omega_c$$

hence $d\theta_c = \omega_c dt$. Using the latter expression and substituting for $\omega_c$ the Expression 46 thereof, it follows that $$(47) \qquad \theta_c = 1.0254\omega_a\int_0^{\omega_a t}\sqrt{1+K\cos\omega_a t}\,dt$$

Since $\theta_a = \omega_a t$, as mentioned above, it follows that $\omega_a dt = d\theta_a$, wherefore by transposition the Expression 47 above becomes $$(48) \qquad \theta_c = 1.0254\int_0^{\theta_a}\sqrt{1+K\cos\theta_a}\,d\theta_a$$

This is an elliptic integral which may be tabulated as follows $$(49) \qquad E(K,\psi) = \int_0^{\psi}\sqrt{1-K^2\sin^2\psi}\,d\psi$$

(taken from Methods of Advanced Calculus, by Philip Franklin, McGraw-Hill Book Co., Inc., 1944). The expression $\cos\theta_a$ in Equation 48 above can also be expressed by the trigonometric identity $$1 - 2\sin^2\frac{\theta_a}{2}$$

(Peirce's Tables). To conform in expression to the angle $\psi$ in Equation 49 above, this trigonometric identity is expressed as $1 - 2\sin^2\psi$, hence $$\cos\theta_a = 1 - 2\sin^2\psi, \text{ where } \theta_a = 2\psi$$

By substituting the above identity $1 - 2\sin^2\psi$ for the expression $\cos\theta_a$ in Equation 48 above, and expressing $\psi$ by $\theta_a$, one obtains $$\theta_c = 2(1.0254)\int_0^{\theta_a}\sqrt{1+K\left(1-2\sin^2\frac{\theta_a}{2}\right)}\,d\frac{\theta_a}{2}$$

or $$\theta_c = 2.0508\int_0^{\theta_a}\sqrt{1+K-2K\sin^2\frac{\theta_a}{2}}\,d\frac{\theta_a}{2}$$

By dividing both sides of the latter equation by $\sqrt{1+K}$, the same becomes $$\frac{\theta_c}{\sqrt{1+K}}=2.0508\int_0^{\theta_a}\frac{\sqrt{1+K-2K\sin^2\frac{\theta_a}{2}}}{\sqrt{1+K}}d\frac{\theta_a}{2}$$

or $$\theta_c=2.0508\sqrt{1+K}\int_0^{\theta_a}\sqrt{\frac{1+K}{1+K}-\frac{2K}{1+K}\sin^2\frac{\theta_a}{2}}d\frac{\theta_a}{2}$$

which reduces to

(50)
$$\theta_c=2.0508\sqrt{1+K}\int_0^{\theta_a}\sqrt{1-\left(\frac{2K}{1+K}\right)\sin^2\frac{\theta_a}{2}}d\frac{\theta_a}{2}$$

The integral (50) is now in the form of the tabulated elliptic integral (49) above and, hence, ready for solution. To this end, the value $$\sqrt{\frac{2K}{1+K}}$$

in Equation 50 above is equal to $\overline{K}$, wherefore the solution form of Equation 50 above becomes

(51) $\quad\theta_c=2.0508\sqrt{1+K}\left[E\left(\sqrt{\frac{2K}{1+K}},\frac{\theta_a}{2}\right)\right]$ or expressed generally

(52) $\quad\theta_c=\frac{2}{\alpha}\sqrt{1+K}\left[E\left(\sqrt{\frac{2K}{1+K}},\frac{\theta_a}{2}\right)\right]$ To use Peirce's Tables for the solution, the parameter $\alpha$ is used instead of $K$, where $$\sin\alpha=\overline{K}=\sqrt{\frac{2K}{1+K}}$$

Thus, to use Peirce's Tables for calculation of $\theta_c$ for the aforementioned exemplary velocity ratio $V_r=2$ with a corresponding value of 0.600 for $K$, $\sin\alpha$ is 0.866 and $\alpha$ is equal to 60°.

Following is a sample calculation of $\theta_c$ for $\theta_a=15°$ and $K=0.600$. Thus, using the aforementioned general expression for $\theta_c$, namely, $$\theta_c=\frac{2}{\alpha}\sqrt{1+K}\left[E\left(\sqrt{\frac{2K}{1+K}},\frac{\theta_a}{2}\right)\right]$$

$\theta_c=2.0508\sqrt{1+0.600}[E(60°, 7\tfrac{1}{2}°)]$ $\quad=2.0508\times1.2649\times0.1305\times57.3$ of which 57.3 is the multiplication factor to obtain $\theta_c$ in angular degrees. Hence, $\theta_c=19.40°$.

Listed below are calculated values of $\theta_c$ for radii $r_c$ of the driven gear 75 (Figs. 3 and 5) at exemplary intervals of 15° of $\theta_a$ of their coordinate radii $r_a$ of the driving gear 74. Also listed with these values of $\theta_a$ and $\theta_c$ are the calculated lengths of the corresponding radii $r_a$ and $r_c$.

| $\theta_a$ (degrees) | $r_a$ (inches) | $\theta_c$ (degrees) | $r_c$ (inches) |
|---|---|---|---|
| 0 | 5.645 | 0 | 4.355 |
| 15 and 345 | 5.638 | 19.40 and 340.60 | 4.362 |
| 30 and 330 | 5.583 | 38.53 and 321.47 | 4.417 |
| 45 and 315 | 5.503 | 57.15 and 302.85 | 4.497 |
| 60 and 300 | 5.390 | 75.10 and 284.90 | 4.610 |
| 75 and 285 | 5.243 | 92.20 and 267.80 | 4.757 |
| 90 and 270 | 5.060 | 108.10 and 251.90 | 4.940 |
| 105 and 255 | 4.851 | 122.90 and 237.10 | 5.149 |
| 120 and 240 | 4.618 | 136.40 and 223.60 | 5.382 |
| 135 and 225 | 4.376 | 148.70 and 211.30 | 5.624 |
| 150 and 210 | 4.154 | 159.90 and 200.10 | 5.846 |
| 165 and 195 | 3.993 | 170.10 and 189.90 | 6.007 |
| 180 | 3.935 | 180 | 6.065 |

Following are sample calculations of the kinetic energies and torques of the driven gears 75 and 76 of the exemplary velocity ratio $V_r=2$, respectively, with $\beta_b$ and $\beta_c$ denoting instantaneous kinetic energy values (lb.-in.) of the respective gears 76 and 75; and $T_b$ and $T_c$ denoting instantaneous torque values (lb.-in.) of the same gears. For these calculations, the following values are used:

$I_b=I_c=38.9$ lb.-in. sec.$^2$, $\omega_a=42.2$ rad./sec., $\theta_a=40°$, $K=0.600$ (for $V_r=2$).

Thus, $\beta_c=\tfrac{1}{2}I_c\omega_c^2$. According to (45) above, $\omega_c=1.0254\omega_a\sqrt{1+K\cos\theta_a}$. Hence, $\beta_c=\tfrac{1}{2}I_c(1.0254\omega_a\sqrt{1+K\cos\theta_a})^2$ $\quad=\tfrac{1}{2}I_c(1.0254\omega_a\sqrt{1+0.600\cos40°})^2$ $\quad=\frac{1.0254^2}{2}I_c\omega_a^2(1+0.600\times0.766)$ $\quad=0.5257\times38.9\times42.2^2(1+0.600\times0.766)$ $\quad=53,200$ lb.-in.

Thus, $\beta_c=53,200$ lb.-in.

Since
$$\beta_b\tfrac{1}{2}=I_b\omega_b^2$$

$\omega_c=1.0254\omega_a\sqrt{1+K\cos\theta_a}$ as mentioned above, it follows from the preceding that $\omega_b=1.0254\omega_a\sqrt{1-K\cos\theta_a}$ Hence, $\beta_b=\tfrac{1}{2}I_c(1.0254\omega_a\sqrt{1-K\cos\theta_a})^2$ $\quad=\tfrac{1}{2}I_c(1.0254\omega_a\sqrt{1-0.600\cos40°})^2$ $\quad=\frac{1.0254^2}{2}I_c\omega_a^2(1-0.600\times0.766)$ $\quad=0.5257\times38.9\times42.2^2(1-0.600\times0.766)$ $\quad=19,670$ lb.-in.

Thus, $\beta_b=19,670$ lb.-in. The instantaneous torque of gear 75 is $$T_c=I_c\alpha_c$$

where $\alpha$ denotes acceleration. The acceleration $\alpha_c$ can be expressed as $$\frac{d\omega_c}{dt}$$

Hence, by using the above expression $\omega_c=1.0254\omega_a(1+K\cos\theta_a)^{1/2}$, and bringing the latter expression into the form of the general expression $dx^n=nx^{n-1}dx$, where $x=1+K\cos\theta_a$, and $n$ is equal to the exponent $\tfrac{1}{2}$, the acceleration can be expressed as:

$$\alpha_c=\frac{d\omega_c}{dt}=(\tfrac{1}{2})1.0254\omega_a(1+K\cos\theta_a)^{-1/2}(-K\omega_a\sin\theta_a)$$

or, by differentiation, $$\alpha_c=\frac{-1.0254}{2}K\omega_a^2\frac{\sin\theta_a}{\sqrt{1+K\cos\theta_a}}$$

$$=-0.5127K\omega_a^2\frac{\sin\theta_a}{\sqrt{1+K\cos\theta_a}}$$

Hence, (53)

$$T_c=I_c\left(-0.5127K\omega_a^2\frac{\sin\theta_a}{\sqrt{1+K\cos\theta_a}}\right)$$

$$=38.9\left(-0.5127\times0.600\times42.2^2\times\frac{0.643}{\sqrt{1+0.600\times0.766}}\right)$$

$$=-11,300\text{ lb.-in.}$$

Thus, $T_c=-11,300$ lb.-in. The instantaneous torque of gear 76 is $T_b = I_b \alpha_b$. The acceleration $\alpha_b$ can be expressed as $$\frac{d\omega_b}{dt}$$

Hence, by using the above expression $\omega_b = 1.0254\omega_a \sqrt{1-K\cos\theta_a}$, $\alpha_b$ can be expressed as follows:

$$\alpha_b = \frac{d\omega_b}{dt} = (\tfrac{1}{2})1.0254\omega_a(1-K\cos\theta_a)^{-\tfrac{1}{2}}(+K\omega_a\sin\theta_a)$$

or, by differentiation, $$\alpha_b = \frac{1.0254}{2} K\omega_a^2 \frac{\sin\theta_a}{\sqrt{1-K\cos\theta_a}}$$

Hence,
(54)

$$T_b = I_b\left[0.5127 K\omega_a^2 \frac{\sin\theta_a}{\sqrt{1-K\cos\theta_a}}\right]$$

$$= 38.9\left[0.5127 \times 0.600 \times 42.2^2 \frac{0.643}{\sqrt{1-0.600\times0.766}}\right]$$

$$= 18,600 \text{ lb.-in.}$$

Thus, $T_b = 18,600$ lb.-in.

In this manner, the instantaneous torques and kinetic energies T and $\beta$ were calculated for many other angles $\theta_a$. Below is a list of some of these calculated instantaneous torques and kinetic energies, presently given at 20° intervals of $\theta_a$. Thus,

| $\theta_a$ (degrees) | $T_b$ (lb.-in.) | $T_c$ (lb.-in.) | $\beta_b$ (lb.-in.) | $\beta_c$ (lb.-in.) | $\Sigma\beta$ (lb.-in.) |
|---|---|---|---|---|---|
| 0 | 0 | 0 | 14,570 | 58,300 | 72,870 |
| 20 | 11,020 | −5,820 | 15,870 | 57,000 | 72,870 |
| 40 | 18,600 | −11,300 | 19,670 | 53,200 | 72,870 |
| 60 | 22,050 | −16,150 | 25,470 | 47,400 | 72,870 |
| 80 | 22,150 | −19,900 | 32,640 | 40,230 | 72,870 |
| 100 | 19,900 | −22,150 | 40,230 | 32,640 | 72,870 |
| 120 | 16,150 | −22,050 | 47,400 | 25,470 | 72,870 |
| 140 | 11,300 | −18,600 | 53,200 | 19,670 | 72,870 |
| 160 | 5,820 | −11,020 | 57,000 | 15,870 | 72,870 |
| 180 | 0 | 0 | 58,300 | 14,570 | 72,870 |
| 200 | −5,820 | 11,020 | 57,000 | 15,870 | 72,870 |
| 220 | −11,300 | 18,600 | 53,200 | 19,670 | 72,870 |
| 240 | −16,150 | 22,050 | 47,400 | 25,470 | 72,870 |
| 260 | −19,900 | 22,150 | 40,230 | 32,640 | 72,870 |
| 280 | −22,150 | 19,900 | 32,640 | 40,230 | 72,870 |
| 300 | −22,050 | 16,150 | 25,470 | 47,400 | 72,870 |
| 320 | −18,600 | 11,300 | 19,670 | 53,200 | 72,870 |
| 340 | −11,020 | 5,820 | 15,870 | 57,000 | 72,870 |
| 360 | 0 | 0 | 14,570 | 58,300 | 72,870 |

Figures 6, 7:
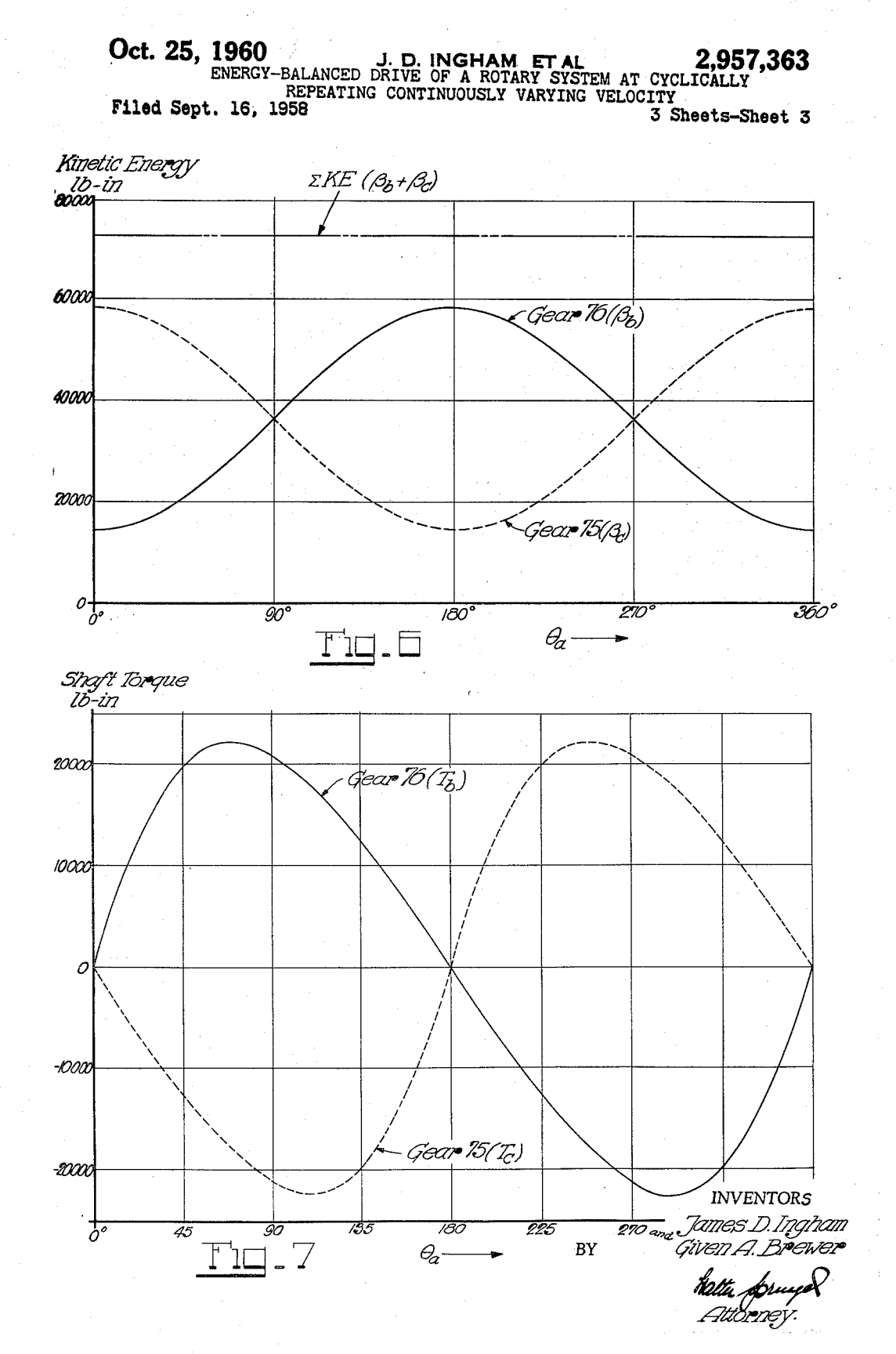

The above computed values of $\beta_b$, $\beta_c$ and $\Sigma\beta$ are plotted in Fig. 6, indicating that the energy level of the driven gears 75 and 76 is constant and that the developed profile equations satisfy this condition.

Similarly, the above computed values of $T_b$ and $T_c$ are plotted in Fig. 7, and it is significant to note that the torques $T_b$ and $T_c$ are not antisymmetric, i.e., are not equal and opposite.

Figure 8:
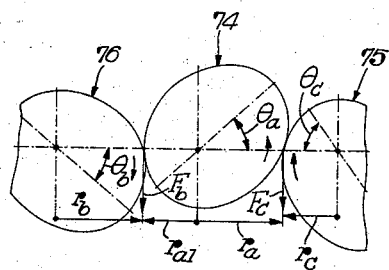
Fig. 8 is a diagrammatic layout of a set of gears similar to that of Fig. 2, but in a different operating position.

It will now be shown that the constant energy level of the driven gears 75 and 76 does indeed produce an exactly balanced torque condition in the drive shaft 37 at any instant, this despite the fact that the torques $T_b$ and $T_c$ are not antisymmetric as proved hereinbefore. Thus considering the momentary condition of the gears 74, 75, and 76 as shown diagrammatically in Fig. 8, where $\theta_a$ is 45°, it follows from Expression 53 above that $$T_c = I_c\left[-0.5127 K\omega_a^2 \frac{\sin 45°}{\sqrt{1+K\cos 45°}}\right]$$

$$= 38.9\left[-0.5127 \times 0.600 \times 42.2^2 \frac{0.707}{1.193}\right] = -12,640 \text{ lb.-in.}$$

Thus, $T_c = -12,640$ lb.-in. It further follows from Expression 54 above that $$T_b = I_b\left[0.5127 K\omega_a^2 \frac{\sin 45°}{\sqrt{1-K\cos 45°}}\right]$$

$$= 38.9\left[0.5127 \times 0.600 \times 42.2^2 \frac{0.707}{0.758}\right] = 19,920 \text{ lb.-in.}$$

Thus, $T_b = 19,920$ lb.-in. To obtain from these computed torques the values of the forces $F_b$ and $F_c$ (Fig. 8) and, in turn, determine whether or not these forces produce torque balance in the driving gear 74, the lengths of the radii $r_a$, $r_c$, $r_{a1}$ and $r_b$ for $\theta_a = 45°$ must first be obtained. To this end, recourse was had to Expressions 13, 22, 18 and 23 above for obtaining the lengths of the radii $r_a$, $r_c$, $r_{a1}$ and $r_b$, respectively (Fig. 8), with the result that $r_a = 5.503$, $r_c = 4.497$, $r_{a1} = 4.376$, and $r_b = 5.624$. Accordingly, $$F_c = \frac{T_c}{r_c} = \frac{-12,640}{4.497} = -2810 \text{ lbs.}$$

and $$F_b = \frac{T_b}{r_b} = \frac{19,920}{5.624} = 3540 \text{ lbs.}$$

The torque produced in the driving gear 74 by the force $F_c$ is $$T_a = F_c r_a = -2810 \times 5.503 = -15,740 \text{ lb.-in.}$$

and the torque produced in the driving gear 74 by the force $F_b$ is $$T_{a1} = F_b r_{a1} = 3540 \times 4.376 = 15,500 \text{ lb.-in.}$$

Hence, the torque unbalance produced in the driving gear 74 and its shaft 37 is $$\Delta T = T_a + T_{a1} = -15,470 + 15,500 = \sim 0$$

The above computed values of $T_a$ and $T_{a1}$ were obtained with slide rule accuracy. If these computed values of $T_a$ and $T_{a1}$ were obtained with greater than slide rule accuracy, their sum total would exactly equal 0. Of course, the same torque balance condition in the driving gear 74 and its shaft 37 will be found for any other angle $\theta_a$.

The profile geometries developed herein for the constant energy gears are general in character and apply to gears of any suitable kind, and not only to the exemplary and preferred gears of spur type shown. Thus, the profile geometries herein for constant energy gears apply to gears of any kind, such as bevel gears, for instance, as long as the center distance D between the gears is measured across the meeting point of the pitch lines of these gears.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An energy-balanced drive for two rotary masses, comprising a prime mover; and an operating connection between said prime mover and masses, said connection including parts turning in unison with said masses, respectively, and mechanical means for rotating said masses at varying speeds at uniform speed of said prime mover and for varying the kinetic energies of said masses and their respective turning parts as like harmonic curves 180° out of phase with each other for each revolution of said prime mover at uniform speed, so that the sum of the kinetic energies of said masses and their respective turning parts will be equal at any instant at uniform speed of said prime mover.

2. An energy-balanced drive for two rotary masses, comprising a drive shaft; and a gear system operatively connecting said drive shaft with said masses, respectively, and including gears turning in unison with said masses, respectively, said gear system being designed to rotate said masses at varying speeds at uniform speed of said drive shaft and to vary the kinetic energies of said masses and their respective turning gears as like harmonic curves 180° out of phase with each other for each revolution of said drive shaft at uniform speed, so that the sum of the kinetic energies of said masses and their respective turning gears is equal at any instant at uniform speed of said drive shaft.

3. An energy-balanced drive for two rotary masses, comprising a drive shaft; and three gears of which two first gears turn in unison with said masses, respectively, and are in mesh and in one-to-one gear ratio with the third gear and the latter turns in unison with said drive shaft, said first gears have pitch lines identical in outline but different in outline from that of the pitch line of said third gear, and said first gears and their respective turning masses have equal inertias, with said pitch lines of said gears designed to rotate said masses at varying speeds at uniform speed of said drive shaft and to vary the kinetic energies of said first gears and their respective turning masses as like harmonic curves 180° out of phase with each other for each revolution of said drive shaft at uniform speed, so that the sum of the kinetic energies of said first gears and their respective turning masses is equal at any instant at uniform speed of said drive shaft.

4. An energy-balanced drive for a rotary utility device at continuously varying velocity of a desired maximum to minimum ratio $V_r$, comprising a driving gear; two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; and a rotary mass turning with one of said driven gears and the other driven gear turning with said utility device; the pitch line of said driving gear being defined by the ends of radii of said driving gear the lengths of which are equal to $$\frac{D\sqrt{1+K}\cos\theta}{\alpha+\sqrt{1+K}\cos\theta}$$

where $\theta$ is the angle of displacement of each of said radii unidirectionally from the radius of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; said driven gears have identical pitch lines each defined by the ends of radii of the respective driven gear which—with respect to their coordinate radii of said driving gears with which they are continuous once during each revolution of said gears—are of lengths equal to D minus the lengths of their respective coordinate radii; and said driven gears with their respective turning mass and utility device constituting rotary systems, respectively, designed to have equal inertias.

5. An energy-balanced drive for a rotary utility device at continuously varying velocity of a desired maximum to minimum ratio $V_r$, comprising a spur-type driving gear; two spur-type driven gears in constant mesh with said driving gear, the rotary axes of said driven gears being equally spaced a desired distance D from, and lying in a common plane with, the rotary axis of said driving gear; and a rotary mass turning with one of said driven gears and the other driven gear turning with said utility device; the pitch line of said driving gear being defined by the ends of radii of said driving gear the lengths of which are equal to $$\frac{D\sqrt{1+K}\cos\theta}{\alpha+\sqrt{1+K}\cos\theta}$$

where $\theta$ is the angle of displacement of each of said radii unidirectionally from the radius of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; said driven gears have identical pitch lines each defined by the ends of radii of the respective driven gear which—with respect to their coordinate radii of said driving gear with which they are aligned and continuous once during each revolution of said gears—are of lengths equal to D minus the lengths of their respective coordinate radii; and said driven gears with their respective turning mass and utility device constituting rotary systems, respectively, designed to have equal inertias.

6. An energy-balanced drive for a rotary utility device at continuously varying velocity of a desired maximum to minimum ratio $V_r$, comprising a driving gear; two driven gears in constant mesh with said driving gear so that the pitch line of said driving gear, the rotary axis of each said driving gear at diametrically opposite points of the pitch lines of said driving gear, the rotary axis of each driven gear being spaced from the rotary axis of said driving gear a desired distance D measured across the meeting point of their pitch lines; and a rotary mass turning with one of said driven gears and the other driven gear turning with said utility device; the pitch line of said driving gear being defined by the ends of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\,max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; said driven gears have identical pitch lines each defined by the ends of radii $r$ of the respective driven gear which—with respect to their coordinate radii $r_a$ of said driving gear with which they are continuous once during each revolution of said gears—are of lengths equal to D minus the lengths of their respective coordinate radii $r_a$; the angle of displacement $\theta$ of each radius $r$ of each driven gear from the radius thereof which is coordinate with said radius $r_{a\,max}$ of said driving gear is equal to $$\frac{2}{\alpha}\sqrt{1+K}\left[E\left(\sqrt{\frac{2K}{1+K}},\frac{\theta_a}{2}\right)\right]$$

where E is the value of the complete integral for the modulus $$\sqrt{\frac{2K}{1+K}}$$

and amplitude $$\frac{\theta_a}{2}$$

and $\theta_a$ is the displacement angle of its coordinate radius $r_a$ of said driving gear; and said driven gears with their respective turning mass and utility device constituting rotary systems, respectively, designed to have equal inertias.

7. An energy-balanced drive for a rotary utility device at continuously varying velocity of a desired maximum to minimum ratio $V_r$, comprising a driving gear; two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; and a rotary mass turning with one of said driven gears and the other driven gear turning with said utility device; the pitch line of said driving gear beng defined by the ends of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\,max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; and said driven gears have identical pitch lines each defined by the ends of radii $r$ of the respective driven gear which—with respect to their coordinate radii $r_a$ of said driving gear with which they are continuous once during each revolution of said gears—are of lengths equal to $$\frac{\alpha D}{\alpha+\sqrt{1+K}\cos\theta_a}$$

where $\theta_a$ is the displacement angle of their respective coordinate radii $r_a$ of said driving gear; and said driven gears with their respective turning mass and utility device constituting rotary systems, respectively, designed to have equal inertias.

8. An energy-balanced drive for a rotary utility device at continuously varying velocity of a desired maximum to minimum ratio $V_r$, comprising a driving gear; two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; and a rotary mass turning with one of said driven gears and the other driven gear turning with said utility device; the pitch line of said driving gear being defined by the end of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\,max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; and said driven gears have identical pitch lines each defined by the ends of radii $r$ of the respective driven gear which—with respect to their coordinate radii $r_a$ of said driving gear with which they are continuous once during each revolution of said gears—are of lengths equal to $$\frac{\alpha D}{\alpha+\sqrt{1+K}\cos\theta_a}$$

where $\theta_a$ is the displacement angle of their respective coordinate radii $r_a$ of said driving gear; the angle of displacement $\theta$ of each radius $r$ of each driven gear from the radius thereof which is coordinate with said radius $r_{a\,max}$ of said driving gear is equal to $$\frac{2}{\alpha}\sqrt{1+K}\left[E\left(\sqrt{\frac{2K}{1+K}},\frac{\theta_a}{2}\right)\right]$$

where E is the value of the complete integral for the modulus $$\sqrt{\frac{2K}{1+K}}$$

and amplitude $$\frac{\theta_a}{2}$$

and said driven gears with their respective turning mass and utility device constituting rotary systems, respectively, designed to have equal inertias.

9. A gear system for an energy-balanced drive of two rotary masses of equal inertias at continuously varying velocity of a desired maximum to minimum ratio $V_r$, comprising a driving gear; and two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; the pitch line of said driving gear being defined by the ends of radii of said driving gear the lengths of which are equal to $$\frac{D\sqrt{1+K}\cos\theta}{\alpha+\sqrt{1+K}\cos\theta}$$

where $\theta$ is the angle of displacement of each of said radii unidirectionally from the radius of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h = \frac{\sqrt{V_r^2-1}}{V_r}$$

and E is the value of the complete integral for the modulus $h$; and said driven gears have identical pitch lines each defined by the ends of radii of the respective driven gear which—with respect to their coordinate radii of said driving gear with which they are continuous once during each revolution of said gears—are of lengths equal to D minus the lengths of their respective coordinate radii.

10. A gear system for an energy-balanced drive of two rotary masses of equal inertias at continuously varying velocity of a desired maximum to minimum ratio $V_r$, comprising a spur-type driving gear; and two spur-type driven gears in constant mesh with said driving gear, the rotary axes of said driven gears being equally spaced a desired distance D from, and lying in a common plane with, the rotary axis of said driving gear; the pitch line of said driving gear being defined by the ends of radii of said driving gear the lengths of which are equal to $$\frac{D\sqrt{1+K}\cos\theta}{\alpha+\sqrt{1+K}\cos\theta}$$

where $\theta$ is the angle of displacement of each of said radii unidirectionally from the radius of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h = \frac{\sqrt{V_r^2-1}}{V_r}$$

and E is the value of the complete integral for the modulus $h$; and said driven gears have identical pitch lines each defined by the ends of radii of the respective driven gear which—with respect to their coordinate radii of said driving gear with which they are aligned and continuous once during each revolution of said gears—are of lengths equal to D minus the lengths of their respective coordinate radii.

11. A gear system for an energy-balanced drive of two rotary masses of equal inertias at continuously varying velocity of a desired maximum to minimum ratio $V_r$, comprising a driving gear; and two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; the pitch line of said driving gear being defined by the ends of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\,max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h = \frac{\sqrt{V_r^2-1}}{V_r}$$

and E is the value of the complete integral for the modulus $h$; said driven gears have identical pitch lines each defined by the ends of radii $r$ of the respective driven gear which—with respect to their coordinate radii $r_a$ of said driving gear with which they are continuous once during each revolution of said gears—are of lengths equal to D minus the lengths of their respective coordinate radii $r_a$; and the angle of displacement $\theta$ of each radius $r$ of each driven gear from the radius thereof which is coordinate with said radius $r_{a\,max}$ of said driving gear is equal to $$\frac{2}{\alpha}\sqrt{1+K}\left[E\left(\sqrt{\frac{2K}{1+K}},\frac{\theta_a}{2}\right)\right]$$

where E is the value of the complete integral for the modulus $$\sqrt{\frac{2K}{1+K}}$$

and amplitude $$\frac{\theta_a}{2}$$

and $\theta_a$ is the displacement angle of its coordinate radius $r_a$ of said driving gear.

12. A gear system for an energy-balanced drive of two rotary masses of equal inertias at continuously varying velocity of a desired maximum to minimum ratio $V_r$, comprising a driving gear; and two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; the pitch line of said driving gear being defined by the ends of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\,max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h = \frac{\sqrt{V_r^2-1}}{V_r}$$

and E is the value of the complete integral for the modulus $h$; and said driven gears have identical pitch lines each defined by the ends of radii $r$ of the respective driven gear which—with respect to their coordinate radii $r_a$ of said driving gear with which they are continuous once during each revolution of said gears—are of lengths equal to $$\frac{\alpha D}{\alpha+\sqrt{1+K}\cos\theta_a}$$

where $\theta_a$ is the displacement angle of their respective coordinate radii $r_a$ of said driving gear.

13. A gear system for an energy-balanced drive of two rotary masses of equal inertias at continuously varying velocity of a desired maximum to minimum ratio $V_r$, comprising a driving gear; and two driven gears in constant mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance D measured across the meeting point of their pitch lines; the pitch line of said driving gear being defined by the ends of radii $r_a$ of said driving gear the lengths of which are equal to $$\frac{D\sqrt{1+K}\cos\theta_a}{\alpha+\sqrt{1+K}\cos\theta_a}$$

where $\theta_a$ is the angle of displacement of each of said radii $r_a$ unidirectionally from the radius $r_{a\ max}$ of maximum length of said driving gear, K is a constant equal to $$\frac{V_r^2-1}{V_r^2+1}$$

and $\alpha$ is a constant equal to $$\frac{2\sqrt{1+K}}{\pi}E(h)$$

where the modulus $$h=\frac{\sqrt{V_r^2-1}}{V_r}$$

and E is the value of the complete integral for the modulus $h$; said driven gears have identical pitch lines each defined by the ends of radii $r$ of the respective driven gear which—with respect to their coordinate radii $r_a$ of said driving gear with which they are continuous once during each revolution of said gears—are of lengths equal to $$\frac{\alpha D}{\alpha+\sqrt{1+K}\cos\theta_a}$$

where $\theta_a$ is the displacement angle of their respective coordinate radii $r_a$ of said driving gear; and the angle of displacement $\theta$ of each radius $r$ of each driven gear from the radius thereof which is coordinate with said radius $r_{a\ max}$ of said driving gear is equal to $$\frac{2}{\alpha}\sqrt{1+K}\left[E\left(\sqrt{\frac{2K}{1+K}},\frac{\theta_a}{2}\right)\right]$$

where E is the value of the complete integral for the modulus $$\sqrt{\frac{2K}{1+K}}$$

and amplitude $$\frac{\theta_a}{2}$$

References Cited in the file of this patent
UNITED STATES PATENTS
2,861,635   Orr ------------------ Nov. 25, 1958